UNITED STATES PATENT OFFICE.

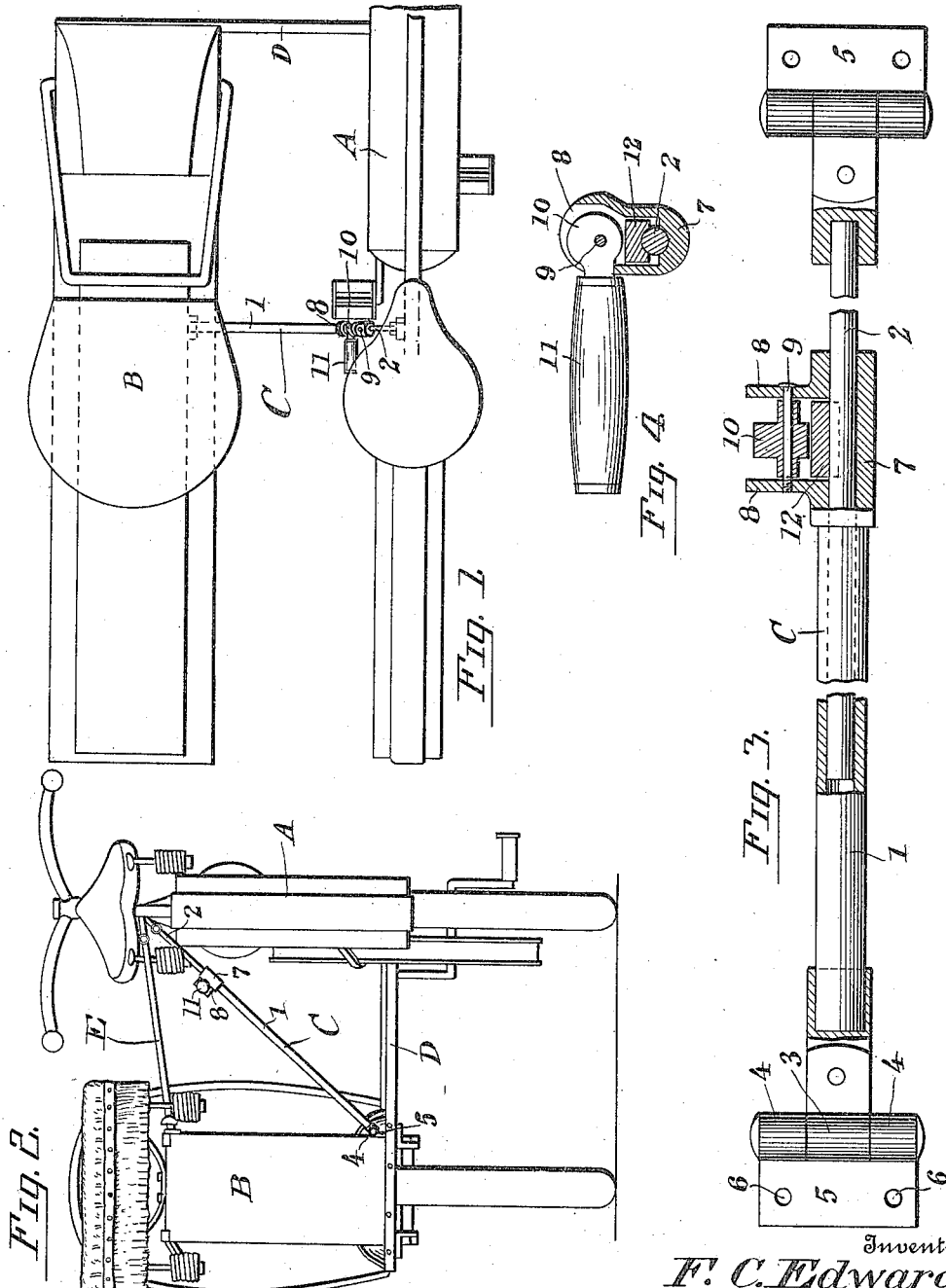

FENDALL C. EDWARDS AND CHARLES J. HUNTER, OF NEWPORT NEWS, VIRGINIA.

SIDE CAR FOR BICYCLES.

1,146,058.

Specification of Letters Patent.

Patented July 13, 1915.

Application filed September 20, 1912. Serial No. 721,436.

*To all whom it may concern:*

Be it known that we, FENDALL C. EDWARDS and CHARLES J. HUNTER, citizens of the United States, residing at Newport News, in the county of Warwick and State of Virginia, have invented new and useful Improvements in Side Cars for Bicycles, of which the following is a specification.

This invention relates to motorcycle attachments, the object in view being to provide what is termed a side car or passenger carrier which is connected to the motorcycle in such manner as to admit of the relative up and down movements of the motorcycle and side car, in accordance with inequalities in the road being traveled upon.

A further object of the present invention is to provide a longitudinally extensible brace which is connected to and interposed between the motorcycle and side car in such manner that while the machine is traveling along the road, the side car and motorcycle may have the requisite relative play referred to, but at any moment desired, the brace may be rendered rigid by either person, thereby rigidly locking the two machines together, so that the motorcycle and the side car may be brought to a standstill, while both wheels are held vertical.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a plan view of a motorcycle, showing a wheeled car attached thereto. Fig. 2 is a rear elevation of the same. Fig. 3 is a detail view of the brace detached. Fig. 4 is a detail view of the cam and adjacent parts.

The present invention resides in a brace which is introduced between a motorcycle, designated at A, and the side car, designated at B. The brace, indicated at C, is of telescopic construction, embodying two relatively slidable members. One of these members, in the preferred embodiment of the invention, is shown as consisting of a tube 1, while the other member is shown as consisting of a rod or smaller tube 2 which is slidable into the tube 1, as clearly shown in Fig. 3. Each of said members is provided at its outer end with a knuckle 3 which is adapted to be received between a pair of knuckles 4 on an attaching plate or clip 5 provided with holes 6 adapted to receive other fasteners, whereby the clip or attaching plate is secured to the frame of the motorcycle or to the frame of the side car, as the case may be. Connected to the inner end of the larger tube 1, is a cam holder 7, shown in the form of a sleeve rigidly attached to said tube. This holder is provided with parallel ears 8 which receive the journal pin 9 of a cam 10 provided with an outwardly extending handle 11, by means of which it may be turned.

12 designates a gib interposed between the cam and the rod 2, so that when the cam 10 is turned, said gib is forced into close binding contact with the rod 2, thereby locking together the two relatively slidable members of the brace, and correspondingly locking the motorcycle and side car against any relative play.

In the drawings, the motorcycle and side car are shown as coupled together by bars or braces C and D which admit of a universal movement of the two structures, thereby better adapting the combination machine to travel with speed along the road. However, when the combined machine is at a standstill, with the couplings described in our former application, there is nothing to prevent the machine from falling to one side or the other. This difficulty is overcome by the novel form of brace hereinabove described, which may be rendered rigid or non-extensible in length, when the machine is at a standstill, or when starting or stopping the machine. As soon as the machine as a whole is in motion, the cam 10 may be thrown over, so as to release the telescopic brace, and thereafter said brace will perform no function whatever, the two parts thereof being free to slide relatively to each other in a longitudinal direction.

What is claimed is:

The combination with a motorcycle frame, and a side car frame, of upper and lower coupling rods in spaced relation to each other terminally hinged to the frames of the motorcycle and side car admitting of the necessary relative movement thereof to compensate for inequalities in the road, an inclined telescopic brace extending diagonally of said coupling rods and terminally hinged to the frames of the motorcycle and side car, and hand operable means on said brace in proximity to the motorcycle saddle for locking and releasing the relatively slidable parts of said telescopic brace.

In testimony whereof we affix our signatures in presence of two witnesses.

FENDALL C. EDWARDS.
CHARLES J. HUNTER.

Witnesses:
J. E. HUNTER,
A. L. POWELL.

Copies of this patent may be obtained for five cents each, by addressing the "Commissioner of Patents, Washington, D. C."